United States Patent [19]
Grider

[11] Patent Number: 4,511,021
[45] Date of Patent: Apr. 16, 1985

[54] BRAKE APPARATUS

[75] Inventor: Bruce A. Grider, Troy, Ohio

[73] Assignee: The B. F. Goodrich Company, Akron, Ohio

[21] Appl. No.: 487,344

[22] Filed: Apr. 21, 1983

[51] Int. Cl.³ .............................................. F16D 65/02
[52] U.S. Cl. ........................... 188/218 XL; 192/107 R
[58] Field of Search .......... 188/73.2, 251 M, 218 XL, 188/251 A, 250 B, 71.5; 192/107 R, 70.2

[56] References Cited

U.S. PATENT DOCUMENTS

| | | | |
|---|---|---|---|
| 3,605,967 | 9/1971 | Warren et al. | 188/218 XL |
| 3,934,686 | 1/1976 | Stimson et al. | 188/218 XL |
| 3,972,395 | 8/1976 | Jannasch et al. | 188/71.5 |
| 4,083,434 | 4/1978 | Pinter | 188/218 XL |
| 4,249,642 | 2/1981 | Anderson et al. | 188/218 XL |

Primary Examiner—Bruce H. Stoner, Jr.
Assistant Examiner—Alvin Oberley
Attorney, Agent, or Firm—Joseph Januszkiewicz

[57] ABSTRACT

A friction brake disc that has a pair of spaced annular surfaces with an inner and outer periphery. Slots within the disc and located either along the outer or inner periphery receive an insert for transferring the loading forces to the walls of the slot to prevent fraying, cracking or crumbling thereof. The inserts are U-shaped in configuration with recesses along the respective side edges of the leg members. Clips secured to the discs adjacent to the slots have curved portions projecting into the recesses to reatin the inserts in their respective slots while allowing some play to maintain full contact between the leg sections of the inserts with the side walls of the slots to minimize the concentration of forces transferred from the inserts to the discs.

12 Claims, 9 Drawing Figures

BRAKE APPARATUS

BACKGROUND OF THE INVENTION

This invention relates to friction braking systems and more particularly to aircraft friction disc brakes having reinforced peripheral slots for use in multiple disc brakes.

In brake assemblies which employ a plurality of brake discs alternately splined to the wheel and axle of an aircraft, it is important to provide specially constructed drive means to reinforce the peripheral slots in the discs to relieve the severe stressing that otherwise would rapidly deteriorate the periphery of the discs. When disc brakes were constructed of steel, the discs were able to withstand the shearing and compressive forces exerted thereon between the slots and the torque transmitting members because of their physical properties. With the replacement of the steel discs with carbon composition discs which have better braking and heat sink characteristics it was important to provide reinforcing inserts at the peripheral slots of the discs since the carbon composites have less strength than steel. The problem with the use of metallic inserts is that the inserts transmit the forces directly to the carbon discs, which are subject to cracking or crumbling if the forces are not properly dispersed.

In some structures the load forces are transmitted via radially disposed pins to the carbon discs. These discs require precise machining for the placement of the radially located holes while simultaneously weakening the discs due to the removal of substantial material along the entire radial wall. In some structures the inserts for the peripheral reinforced slots transmit the forces to the insert rivets and then to the openings in the disc through which the rivets extend. These openings accept all of the discs loading and are therefore subject to undesirable very high stress concentrations. The present invention utilizes an insert at the peripheral slots that provides bearing surface in the drive notch or the peripheral slot of the carbon rotor or carbon stator, thus reducing the carbon area of loading resulting from the limited engagement of the mating wheel or torque plate driving lug with the slot and thereby extend the service life of the slot to equal that of the carbon composite's life as a heat sink. The insert has a pair of opposed faces which frictionally contact the opposite walls of the slots to distribute the load. Retaining clips or plates are used to retain the inserts in position within the slots and through its load distribution prevents fraying of the carbon composite heat sink material while also taking up stresses. The structure of the insert and clip provides for a large bearing area and minimizes the weight required to obtain the strength to handle the side loads due to misalignment. The construction permits the insert to float within the slot of the carbon disc. Such construction permits the partial absorption of the energy by the clip from the resulting movement of the insert. To further enhance this feature, the clip retainers are made of a spring type material. The present invention of the clip and insert simplify the machining, forgeability and lower weight. One feature of the present design which has proven highly desirable is the fact that the clip and insert combination removes the point or location of fatigue failure experienced in current designs while reducing the destructive natural frequencies of vibration by adding multiple contact interfaces which tend to reduce or disrupt the high frequency vibrations.

SUMMARY OF THE INVENTION

The present invention contemplates a friction brake disc type assembly with the discs having flat annular surfaces and a plurality of circumferentially spaced slots or notches along the outer periphery of the rotating discs and slots or notches along the inner periphery of stationery discs. An insert is positioned within each slot for contact with either the spline or drive lugs of a torque device in the case of the rotating disc or with key members that are fixedly secured to a stationary torque tube. The inserts are U-shaped with each leg having a pair of side portions that are recessed for engagement by clips that are fixedly secured to the discs and retain the inserts within their slots permitting a slight degree of movement because of a clearance space between the clips and the inserts.

DESCRIPTION OF THE PREFERRED EMBODIMENT

Figure 1:
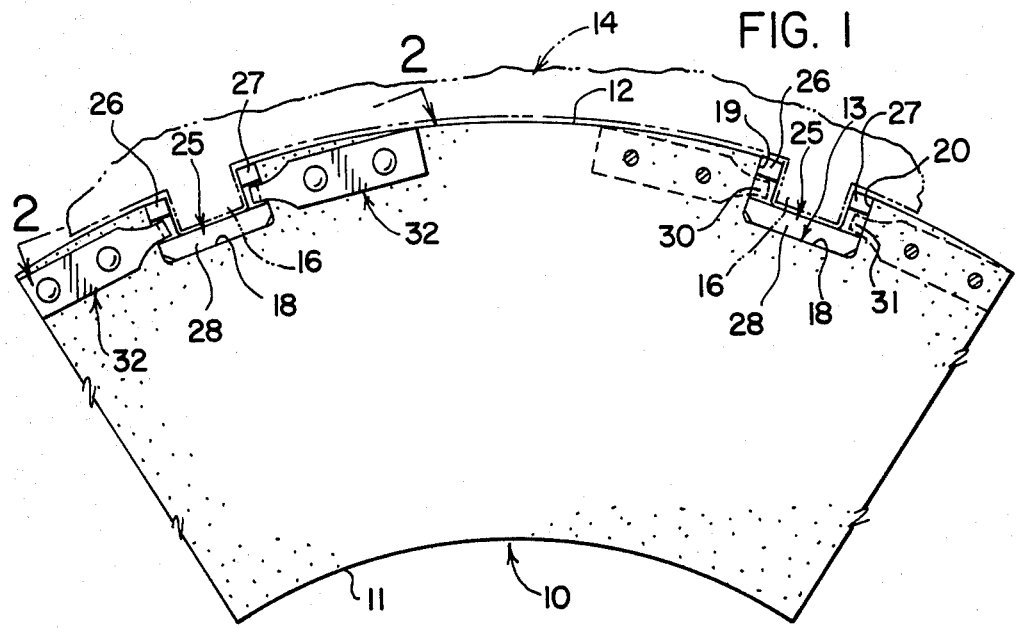
FIG. 1 is a fragmentary side elevational view of a brake disc assembly with a key slot and an insert and clip secured to one of the peripheral slots and only an insert in the remaining slot shown.
Figure 2:
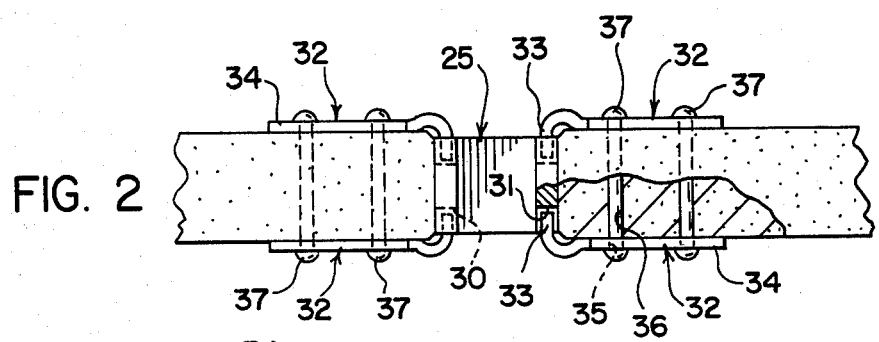
FIG. 2 is plan view of a portion of brake disc assembly shown in FIG. 1 with a portion of the brake disc and clip broken away.

Referring to the drawings, wherein like reference numerals designate like or corresponding parts throughout the several views, there is shown in FIG. 1 a friction brake disc 10 in the form of a rotor of a multiple disc aircraft brake. Although only a portion of one rotor disc is shown, it is understood that multiple discs refers to the plurality of axially spaced-apart annular rotor discs which are suitably splined for axial movement along a mating key or spline that is part of the rotating wheel. The plurality of annular rotors are interleaved with annular stator discs which in turn are suitably splined for axial movement along a mating key member (or members) that is fixedly secured to a torque tube not shown. Disc as used and described herein can be either a stator or rotor disc. Disc 10 is an annular member having a pair of flat parallel annular wall surfaces with an inner periphery 11 and an outer periphery 12. The flat parallel annular wall surfaces are also parallel to adjacent annular wall surfaces of adjacent discs. As seen in FIGS. 1 and 2, disc 10 has a plurality of circumferentially spaced slots 13 along its outer periphery 12.

The disc 10 is fabricated from a carbon material such as bulk graphite or carbon fabric composite. The discs 10 can be molded from chopped fibers of cellulose or other carbonizable materials together with a resin layer also to be carbonized, or can be molded from powders of graphite (or other forms of carbon) plus a carbonizable resin. The discs can be molded carbon or made from carbon forming materials with resins of high coking value and sintered at temperatures sufficient to obtain carbon to carbon bonded structures. The sintering is done in a protective atmosphere. The disc 10 can be made by laying up flat sheets of cellulosic material each impregnated with a carbonizable resin and the whole assembly then pressed and sintered at elevated temperatures. The process for making the carbon discs is well known in the art and therefore will not be described herein.

A torque device 14 (shown in phantom lines in FIG. 1) is located adjacent to the outer periphery 12 of the discs 10 (only a portion of one shown in FIG. 1). Torque device 14 has a plurality of splines, ribs or disc engaging members 16 projecting into slots 13 to provide a means for applying a load or force on the disc 10 by its engagement with slot 13. Slot 13 has a bottom surface 18, and two radially extending planar side walls 19 and 20.

A metal insert 25 (FIG. 2) is located within each slot 13 to provide a reinforcement means for driving contact from the splines 16 of the torque device 14. Each insert has a generally U-shaped configuration, with a pair of end sections 26-27 which are adapted to engage the planar side walls 19 and 20 of slot 13 such that the forces applied to the end sections 26-27 transfer the forces to the appropriate planar side walls 19 or 20. The end sections 26 and 27 are interconnected by a bridging section 28. The bottom surface of the bridging section 28 is in abutting contact with the bottom surface 18 of slot 13. The respective end sections 26 and 27 have pairs of recesses 30 and 31 respectively at each end of both side portions.

The respective side edges of the end sections 26 and 27 terminate adjacent to the side surfaces of annular disc 10 defining an outer edge.

Figure 3:
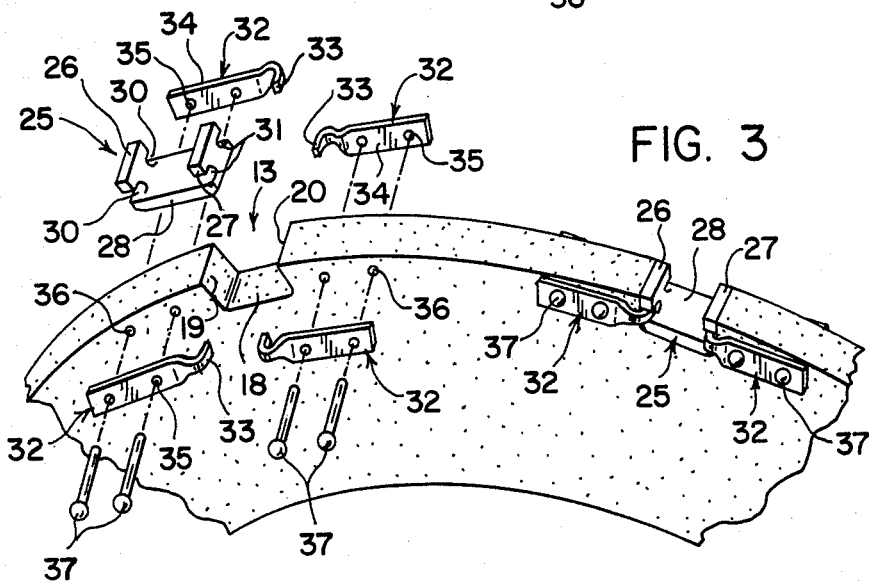
FIG. 3 is an exploded perspective view of the insert and clip in cooperative relationship relative to a fragmentary portion of a rotor brake disc, and also showing an insert and clip in position in one of the slots.

The inserts 25 are retained within their respective slots via four clips 32. Each clip 32 is an elongated member with a reduced end portion 33 that curves inwardly at approximately a right angle to the main body 34. The main body 34 of each clip 32 has a pair of spaced bores 35 which when aligned with spaced bores 36 in the outer periphery of disc 10 extends the hooked or curved end portion 33 of clip 32 within the recess 30 or 31 depending on which direction such clip 32 is placed. Clip 32 is retained in its located position on the outer periphery of disc 10 by rivets 37 extending through the bores 35 and 36. It will be noted that the rivets 37 retain a pair of spaced clips 32 on opposite faces of the disc 10. As seen in FIGS. 2 and 3, four clips 32 are used to retain a single insert 25 within each slot 13.

Figure 4:
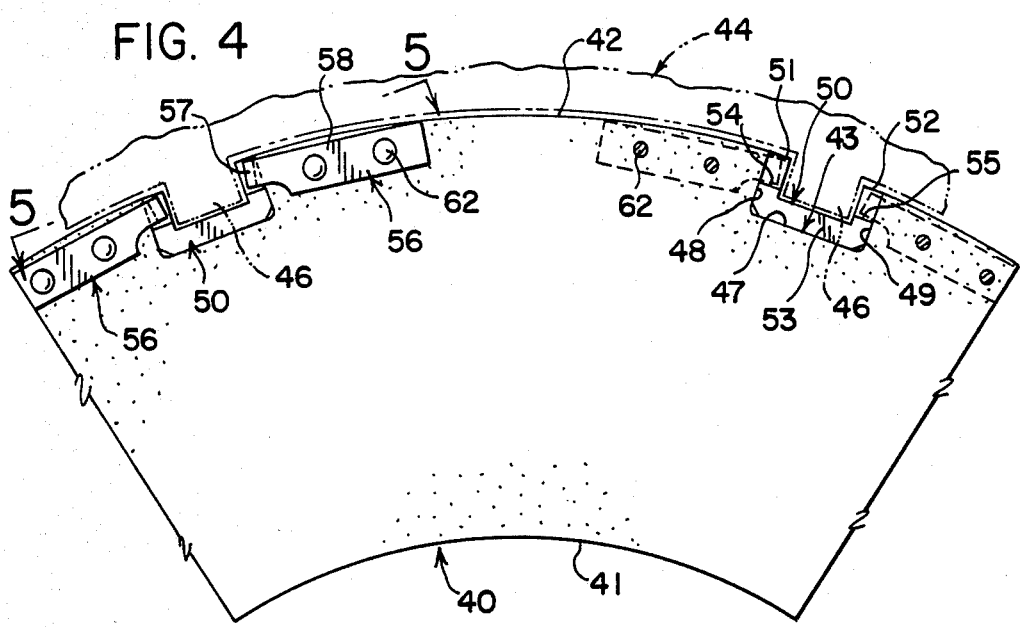
FIG. 4 is a fragmentary side elevational view of a modified form of a brake disc assembly as shown in FIG. 1 with a pair of peripheral key slots having an insert and clip in one slot and only an insert in the other slot.
Figure 5:
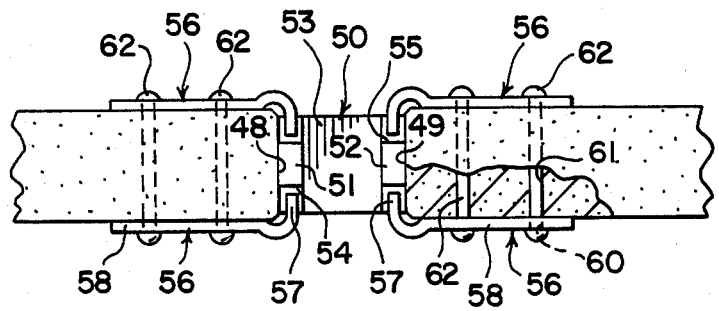
FIG. 5 is a plan view of a portion of modified form of the brake disc assembly shown in FIG. 4 with a portion of the disc broken away.
Figure 6:
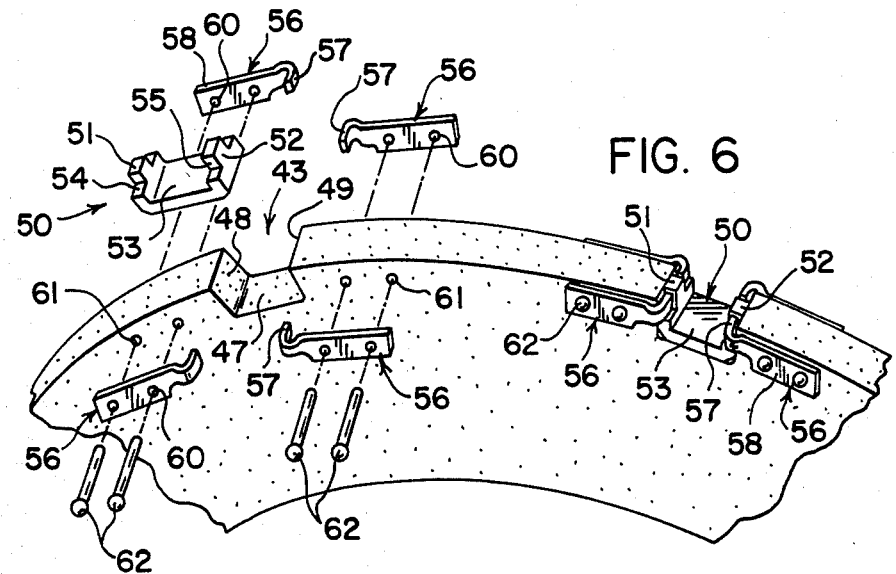
FIG. 6 is an exploded perspective view of a modified form of an insert and clip shown in Fig. 5 in cooperative relationship relative to a fragmentary portion of a rotor brake disc and also showing an insert and clip in position in one of the slots.

A modification of the above described insert and clip is shown in FIGS. 4-5-6. There is shown in FIG. 4 an annular friction brake disc 40 in the form of a rotor of a multiple disc aircraft brake. As in the first embodiment such rotor disc brake is only a portion of one rotor disc, it being understood that multiple discs refer to the plurality of axially spaced annular rotor discs which are suitably splined or keyed for axial movement along a key or spline that is part of the rotating wheel. Such annular rotor discs are interleaved with annular stator discs which in turn are also suitably splined for axial movement along a mating key member that is fixedly secured to a torque tube not shown. When referring to a disc, it is understood that the disc can be either a rotor or stator disc such that the slot is in the outer periphery of a rotor and in the inner periphery of the stator disc, otherwise the invention is applicable to either. The disc described is a rotor disc. Disc 40 is an annular member having a pair of flat parallel annular wall surfaces with an inner periphery 41 and an outer periphery 42 as in disc 10. Disc 40 has a plurality of circumferentially spaced slots 43 along its outer periphery 42. Disc 40 is fabricated from a carbon material as in disc 10 described above.

A torque device 44 (shown in phantom lines in FIG. 4) is located adjacent to the outer periphery 42 of disc 40 and suitably engages and drives the rotor discs 40 via a plurality of circumferentially spaced splines, ribs or disc engaging members 46 which project into slots 43 of disc 40. Disc 40 is rotated by the driving force exerted by ribs against the sidewalls of the slot 43 via an insert device to be described. Slot 43 has a bottom surface 47, and two radially disposed planar side walls 48 and 49.

A metal insert 50 is located within each slot 43 to provide a reinforcement means for driving contact from the ribs or splines 46 of the torque device 44. Each insert 50 has a generally U-shaped configuration, with a pair of end sections 51 and 52 which are adapted to engage the planar side walls 48 and 49 of slot 43 such that the forces applied to the end sections 51 and 52 transfer the forces to the appropriate planar sidewalls 48 or 49 in accordance with the direction of rotation of such torque device 44. The end sections 51 and 52 are interconnected by a bridging section 53. The bottom surface of such bridging section 53 is in abutting contact with the bottom surface 47 of slot 43. The respective end sections 51 and 52 are each recessed as at 54 and 55 at their respective upper outer corners. The respective side edges of the end sections 51 and 52 terminate adjacent to the side surfaces of annular disc 40.

The inserts 50 are retained within their respective slots 43 via four clips 56. Each clip 56 is an elongated member with a reduced end portion 57 that curves inwardly at approximately a right angle to the main body 58. The main body 58 of each clip 56 has a pair of spaced bores 60 which when aligned with spaced bores 61 in the outer periphery of disc 40 extends the hooked or curved end portion 57 of clip 56 within recess 54 or 55 depending on which direction such clip 56 is placed on the periphery of disc 40. Clip 56 is retained in its located position on the outer periphery of disc 40 by rivets 62 extending through the bores 60 and 61. It will be noted that the rivets 62 retain a pair of spaced clips 56 on opposite faces of the disc 40. As seen in FIGS. 5 and 6, four clips 56 are used to retain a single insert 50 within each slot 43.

Figure 7:
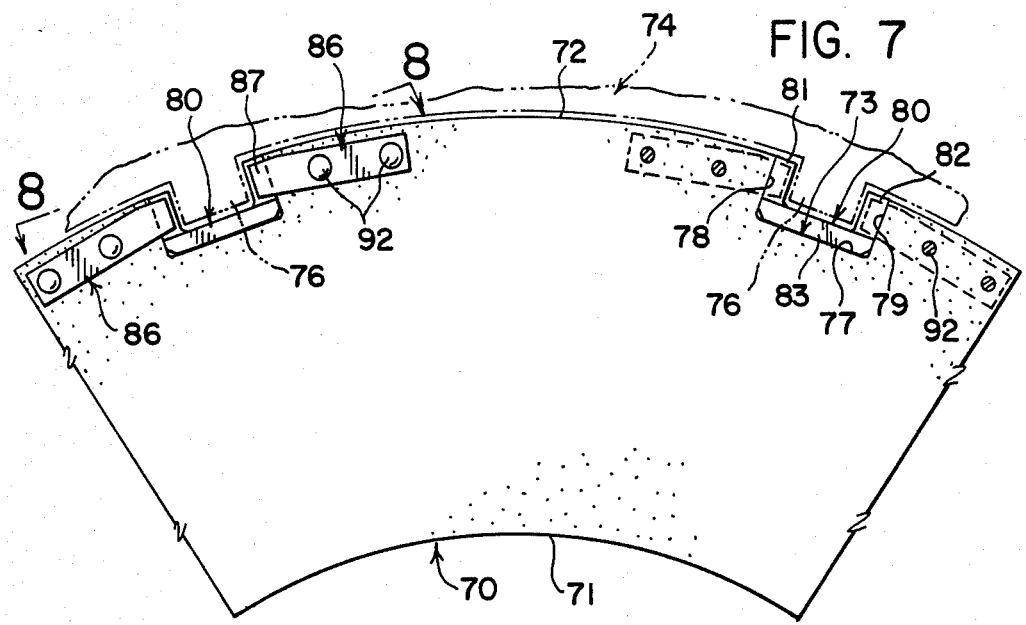
FIG. 7 is a fragmentary side elevational view of a brake disc assembly with a key slot and a modified form of insert and clip secured to one of the peripheral slots and only an insert in the remaining slot shown.
Figure 8:
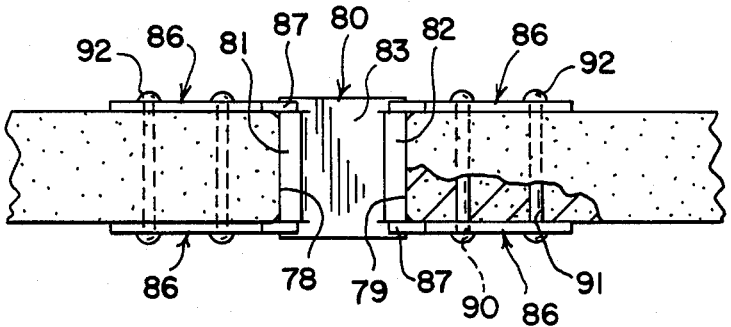
FIG. 8 is a plan view of a portion of a brake disc as shown in FIG. 7 with a portion of the brake disc broken away.
Figure 9:
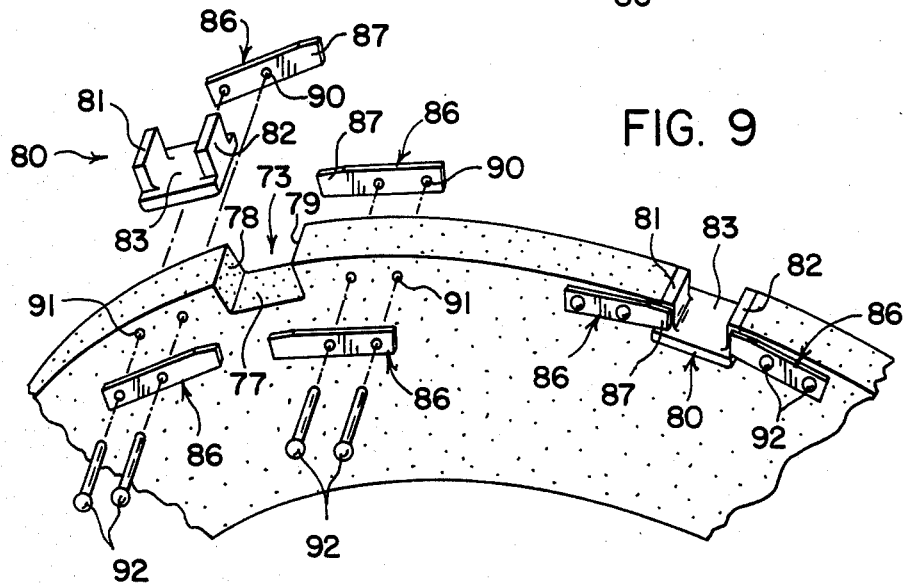
FIG. 9 is an exploded perspective view of a modified form of insert and clip of FIGS. 7 and 8 showing such insert and clip in cooperative relationship relative to a fragmentary portion of a rotor brake disc, and also showing an insert in position in one of the slots.

A further modification of the above described insert and clip is shown in FIGS. 7 through 9. There is shown in FIG. 7 an annular friction brake disc 70 in the form of a rotor of a multiple disc aircraft brake. As in the first embodiment such rotor disc brake is only a portion of one rotor disc, it being understood that multiple discs refer to the plurality of axially spaced annular rotor discs which are suitably splined or keyed for axial movement along a key or spline that is part of the rotating wheel. Such annular rotor disc are interleaved with annular stator discs which in turn are also suitably splined for axial movement along a mating key member that is fixedly secured to a torque tube not shown. When referring to a disc, it is understood that the disc can be either a rotor or stator disc such that the slot is in the outer periphery of a rotor and in the inner periphery of the stator disc, otherwise the invention is applicable to either. The disc described is a rotor disc. Disc 70 is an annular member having a pair of flat parallel annular wall surfaces with an inner periphery 71 and an outer periphery 72 as in disc 10. Disc 70 has a plurality of circumferentially spaced slots 73 along its outer periphery 72. Disc 70 is fabricated from a carbon material as in disc 10 described above.

A torque device 74 (shown in phantom lines in FIG. 7) is located adjacent to the outer periphery 72 of disc 70 and suitably engages and drives the rotor discs 70 via a plurality of circumferentially spaced splines, ribs or disc engaging members 76 which project into slots 73 of disc 70. Disc 70 is rotated by the driving force exerted by ribs against the sidewalls of the slot 73 via an insert device to be described. Slot 73 has a bottom surface 77, and two radially disposed planar side walls 78 and 79.

A metal insert 80 is located within each slot 73 to provide a reinforcing means for driving contact from the ribs or splines 76 of the torque device 74. Each insert 80 has a generally U-shaped configuration, with a pair of end sections 81 and 82 which are adapted to engage the planar side walls 78 and 79 of slot 73 such that the forces applied to the end sections 81 and 82 transfer the forces to the appropriate planar sidewalls 78 or 79 in accordance with the direction of rotation of such torque device 74. The end sections 81 and 82 are interconnected by a bridging section 83. The bottom surface of such bridging section 83 is in abutting contact with the bottom surface 77 of slot 73. The respective end sections 81 and 82 are narrower in width than the bridging section 83, however, the respective end sections 81 and 82 are the full width of the slot 73 such that respective side edges of the end sections 81 and 82 terminate adjacent to the side surfaces of annular disc 40. Thus the respective side edges of the bridging section 83 projects beyond the edges of the slot 73 to provide an abutment for a purpose to be described.

The inserts 80 are retained within their respective slots 73 via four clips 86. Each clip 86 is an elongated member with an end portion 87 that abuttingly engages the abutment of the bridging section 83. The main body of each clip 86 has a pair of spaced bores 90 which when aligned with spaced bores 91 in the outer periphery of disc 70 extends the end portion 87 of clip 86 into abutting contact with the side edges or the abutment of the bridging sections as seen in Fig. 7. Clip 86 is retained in its located position on the outer periphery of disc 70 by rivets 92 extending through the bores 90 and 91. It will be noted that the rivets 92 retain a pair of spaced clips 86 on opposite faces of the disc 70. As seen in FIG. 8 four clips 86 are used to retain a single insert 70 within each slot 73.

The inserts 25, 50 and 80 provide increased bearing surfaces in the drive notch to thereby eliminate undue stress concentration on the wall surfaces of carbon rotor or carbon stator discs, thereby extending the service life of such discs.

The operation of the three described embodiments are substantially alike and therefore the operation of only one embodiment will be described.

In multiple disc brakes, the ribs or splines 16 of torque device 14 extends into the slots 13 of the axially aligned rotor brake discs 10. The respective slots 13 receive the inserts 25 such that the respective clips 32 at the respective corners of the inserts will retain each insert 25 within the slot since the respective curved reduced end portions 33 project into the recesses 30 and 31 to thereby retain the insert 25 within the slot in a floating or loose condition. This design permits the insert 25 to float freely in the slot 13 of the carbon disc 10 eliminating any tension thereon that otherwise would occur if insert 25 were firmly riveted to the disc 10. By permitting the floating of insert 25, the planar surfaces of the end sections 26 or 27 will fully contact the side walls 19 or 20 of the slot 13 in disc 10 depending on the direction of rotation of the torque device 14.

Stator discs can also be provided with similar torque-transmitting inserts in a manner similar to those used in the rotor disc 10 described above. The stator discs are axially aligned and interleaved between the annular axially aligned and axially spaced rotor discs 10 and would operate on the inserts and clips as described in the embodiments described. When the brakes are applied, the rotor discs 10 and the stator discs are axially squeezed together. The frictional forces between the faces of the rotor discs and the stator discs create a load at the slots of the discs as they bear against the splines and the ribs. This load is transmitted to the sides or end sections of the inserts, which via their flat faces exert a force directly on the walls of the slot 13 as in the rotor disc. The insert provides an increased bearing surface in the drive notch or slot of the carbon discs, thus reducing the carbon loading resulting from the limited engagement of the torque transmitting devices ribs 16 and thereby provides a service life equal to that of the frictional wear life of the carbon composite heat sink (discs 10). The clips 32 used in conjunction with the insert 25 hold the insert in position thereby preventing the carbon behind the inserts from fraying. This design permits relative motion of the insert 25 which allows the energy resulting from the clips movement to be partially absorbed by the clips 32. In those instances where the clip 32 is made of a spring type steel material, the energy absorbed is greater. The design as described above is simple in construction and only requires simplified machining, increases forgeability and is of lower weight when compared to similar inserts and clips. The other benefit of this designed insert and clip assembly is that it removes the point or location of fatigue failure experienced in previous clip designs and further it reduces or disrupts the potentially destructive natural frequency that causes vibration.

Various modifications are contemplated and may obviously be resorted to by those skilled in the art without departing from the described inventions as hereinafter defined by the appended claims, as only preferred embodiments thereof have been defined.

I claim:

1. In a friction brake disc having a pair of annular flat wall surfaces, an inner peripheral wall surface, and an outer peripheral wall surface; said disc having a plurality of circumferentially spaced slots along the outer periphery extending in said outer peripheral wall surface and disposed for engagement by a spline of a torque device; each of said slots having two generally radially extending wall portions and a bottom surface extending between and interconnecting said wall portions; an insert located within each of said slots for reinforcing said slots; each of said inserts having a general U-shaped configuration with two spaced legs and an interconnecting bridging section; each of said legs having a generally radially extending wall portion with a pair of spaced side edges; each of said legs having a pair of recesses that extend inwardly into said wall portion from each of said side edges; a pair of clip members secured to said brake disc adjacent to each side wall of each of said slots; each of said clip members having an end portion projecting into one of said recesses of said insert for retaining said insert in said slot; said end portions being smaller in dimension than said recesses to provide a clearance space to permit said inserts to float freely relative to said clearance space to permit said inserts to float freely relative to said stationary clips.

2. In a friction brake disc as set forth in claim 1 wherein pairs of said clips are secured to said disc by rivets mounted in the peripheral edge of said disc.

3. In a friction brake disc as set forth in claim 2 wherein said recesses on each of said side wall portions is located intermediate the upper and lowermost portion thereof.

4. In a friction brake disc as set forth in claim 2 wherein said recesses on each of said side wall portions is located at the upper outermost corner thereof.

5. In a friction brake disc as set forth in claim 2 wherein said clips are made from a spring type steel material to absorb and dissipate forces of vibration imparted to said brake disc and said insert.

6. In a friction brake disc having a pair of annular flat wall surfaces, an inner peripheral wall surface, and an outer peripheral wall surface, said disc having a plurality of circumferentially spaced slots along one of said periphery wall surfaces for engagement by a spline of a torque device; each of said slots having two generally radially extending walls and a bottom surface extending between and interconnecting said walls; an insert located within each of said slots for reinforcing said slots; each of said inserts having a general U-shaped configuration with two spaced end sections and an interconnecting bridging section; each of said end sections having a pair of spaced side edges and an outer edge; said outer edge terminating at said one peripheral wall surface; all of said side edges of said inserts being recessed; a clip secured to said disc adjacent to each of said recesses; each of said clips having a curved projection extending into an adjacent recess of said inserts to retain said insert within said slots; there being four clips for each of said inserts; and there being a clearance space between said curved projections of said clips and said recesses of said inserts to provide a floating action of said inserts within their respective slots.

7. In a friction brake disc as set forth in claim 6 wherein said recesses are located at the respective junctures of the outer edge with said side edges.

8. In a friction brake disc as set forth in claim 6 wherein said recesses are located along the intermediate portion of said side edges.

9. In a friction brake disc as set forth in claim 8 wherein said clips are made of a spring type steel material to absorb energy forces.

10. In a friction brake disc having a pair of annular flat wall surfaces, an inner peripheral wall surface, and an outer peripheral wall surface, said disc having a plurality of circumferentially speced slots along one of said periphery wall surfaces for engagement by a spline of a torque device; each of said slots having two generally radially extending wall surfaces and a bottom surface that extends between and interconnects said radially disposed wall surfaces; an insert located within each of said slots for reinforcing said slots; each of said inserts having a general U-shaped configuration with two spaced end sections and an interconnecting bridging section; each of said end sections having a side wall that is in full width contact with an adjacent one of said radially disposed wall surfaces of said slots; said bridging section being of greater width than said bottom surface of said slot thereby extending outwardly beyond said slot to present an abutment; a clip secured to said disc along the periphery of said disc; each of said clips having an end portion projecting into abutting engagement with said abutment on said bridging section to retain said insert within said slots; and there being four clips for each of said inserts.

11. In a friction brake disc as set forth in claim 10 wherein a clearance space is provided between said end portion of said clips and corresponding adjacent abutments of said bridging section.

12. In a friction brake disc as set forth in claim 11 wherein said clips are made of a spring type steel material to absorb energy forces.

* * * * *